E. F. W. ALEXANDERSON.
SERIES MULTIPLE CONTROL.
APPLICATION FILED FEB. 10, 1917.
1,365,441.
Patented Jan. 11, 1921.
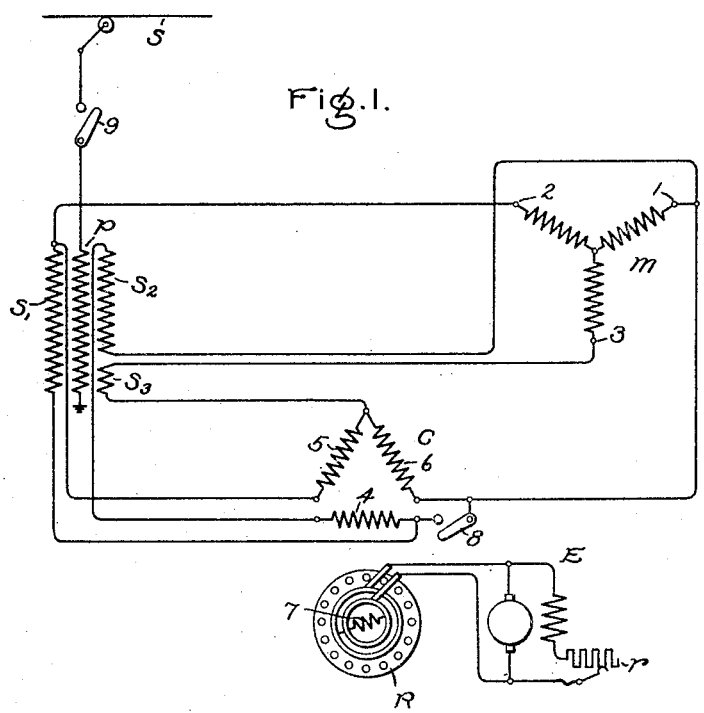
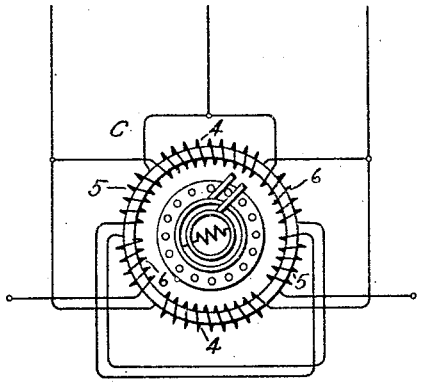
Inventor:
Ernst F. W. Alexanderson,
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SERIES-MULTIPLE CONTROL.

1,365,441.  Specification of Letters Patent.  Patented Jan. 11, 1921.

Application filed February 10, 1917. Serial No. 147,912.

*To all whom it may concern:*

Be it known that I, ERNST F. W. ALEXANDERSON, a citizen of the United States, residing at Schenectady, in the county of Schenectady, State of New York, have invented certain new and useful Improvements in Series-Multiple Control, of which the following is a specification.

This invention relates to the operation of polyphase motors from a single phase source of supply, by the use of a phase converter, and more especially to a system wherein the connections of the converter and motor may be changed from a series arrangement to a parallel arrangement.

The operation of polyphase motors from a single phase source of supply by the use of a phase converter of the polyphase motor type having a squirrel cage or phase wound secondary is well-known and hitherto both the series arrangement and the parallel arrangement of converter and motor windings have been employed.

In my prior application, Serial No. 815,280, filed January 29, 1914, Patent No. 1,300,542, granted April 15, 1919, I have disclosed and claimed a system comprising a single phase source of electrical energy, polyphase induction motors adapted to be operated therefrom, and a phase converter of the polyphase motor type which is adapted to be synchronously excited to the desired degree by means independent of the stator windings, and a method and means whereby said system may be operated with the converter and motor having either the series arrangement of connections or the parallel arrangement of connections as may be advisable in view of the particular conditions under which the system is to operate.

By the series arrangement of converter and motor, it is understood that one phase of the converter and one phase of the motor are connected in series with the source of electrical energy, while another phase or other phases of the converter are connected in series with another phase or other phases respectively of the motor.

By the parallel arrangement of connections it is understood that one phase of the converter and one phase of the motor are connected in parallel to the source of electrical energy, and another phase or other phases of the converter are connected to another phase or other phases respectively of the motor.

With the series arrangement of connections, if the phase converter be synchronously excited in the manner indicated and said synchronous excitation be properly adjusted, a substantial balance of the polyphase currents and the theoretically correct phase angle between the polyphase currents will be automatically maintained at all loads, and furthermore the power factor of the converter will be improved.

With the parallel arrangement of connections, if the converter be synchronously excited in the manner indicated, the power factor of the converter may, by the proper adjustment of the synchronous excitation, be increased to any desired value.

With the parallel arrangement, however, a balance of polyphase currents is obtained only at a predetermined load, and, although at said load the operation with the parallel arrangement is much superior to that of the series arrangement, nevertheless if the load be varying the series arrangement is preferable on account of its inherent tendency to maintain balanced polyphase currents.

The system in my prior application, hereinbefore referred to, is illustrated as applied to the operation and control of a two-phase load circuit.

One object of my present invention is to adapt a system of the type referred to, which it is designed to operate sometimes with the series arrangement of connections and at other times with the parallel arrangement of connections, to the control of a three-phase load circuit. Other objects are to facilitate and simplify the necessary connections and changes therein and to improve the efficiency of the converter by employing a novel and improved scheme of connecting the converter windings.

My invention will be more readily understood from the following description, when taken in connection with the accompanying drawings, in which Figure 1 is a diagram showing the connections between the several elements of my system; and Fig. 2 is a diagram illustrating one way in which the windings of the converter may be arranged and connected.

Referring to Fig. 1, a single phase source of energy S is connected to the primary P of a transformer which is provided with secondary windings $S_1$ $S_2$ $S_3$. Three-phase motor M is provided with terminals 1, 2 and 3, and, as illustrated, is star connected, although it is obvious that if desired a delta connection may be employed. A converter C is provided with stator windings 4, 5 and 6, and also with a rotor R of the induction motor type upon which is carried a winding 7 connected by means of slip rings and brushes to an exciter E, the voltage of which may be adjusted by means of the variable resistance $r$. The switches 8 and 9 are provided for purposes hereinafter described.

Referring to Fig. 2, in which the stator of the converter is conventionally represented as a Gramme ring, the windings 4, which are adapted to be connected to the supply, constitute the inducing windings, while the windings 5 and 6 constitute the induced windings. In order to increase the winding efficiency and to facilitate the attainment of the desired connections, I have connected the two portions 5 of the secondary winding in series, as well as the two portions 6, and have connected the upper portions 5 and 6 to a common lead. This arrangement of windings permits a higher winding efficiency than the plain open delta arrangement indicated in Fig. 1 or the arrangement wherein the portions of the windings 5 and 6 on the same side of the ring are connected in series. With the arrangement shown in Fig. 2 the windings are preferably designed so that the sum of the current carrying capacities of the branches 5 and 6 is substantially equal to the current carrying capacity of the winding 4. Although in Fig. 2 a two-pole ring winding is shown, it will be obvious to those skilled in the art how any equivalent arrangement may be arranged with other kinds of windings and other pole arrangements.

Referring again to Fig. 1, assume the switch 9 to be closed, the rotor R of the converter to be operating at synchronous speed, which will be the case if the converter is excited by means of the exciter E, and the induction motor to be running. If switch 8 be open the series arrangement between the converter and motor will obtain, and, assuming the converter to be fully excited, the phase relation between the polyphase currents will be theoretically correct and the polyphase currents will be balanced regardless of the motor load.

Although ordinarily the conditions resulting with full excitation are desired, it may be noted that if the converter be under excited, which condition may be effected by adjusting the voltage of the exciter E, the currents in the motor phases will be unbalanced and the phase angles therebetween will have less than the theoretically correct values. Again, if the converter be over-excited, the currents in the motor phases will be unbalanced to an extent depending on the degree of over-excitation, and the phase angles therebetween will have greater than the theoretically correct values.

By increasing the excitation of the converter with the series arrangement of connections the power factor of the converter can be improved, but the improvement of the power factor is more limited than in the case of the parallel connection. Since the system with this arrangement of connections will, with proper converter excitation, maintain balanced currents in the motor phases at all loads, this arrangement is particularly suited to operation with varying load conditions.

If the switch 8 be closed, the parallel relation between the converter and motor, hereinbefore described, will obtain, whereby at some predetermined load, depending upon the design of the converter, balanced currents in the several phases may be obtained, and, by suitable adjustment of the converter excitation, the power factor of the converter may be corrected to the desired value.

It therefore appears that, with the switch 8 open, my system is well adapted to handle fluctuating motor loads, and will maintain balanced currents in the several phases, while, with the switch closed, my system will have maximum output and a high power factor and, at a predetermined load, balanced polyphase currents will obtain. Hence it is possible by the manipulation of the single switch 8 to adapt my system for the most satisfactory operation on fluctuating loads or alternatively for the most satisfactory operation on a predetermined load of high value.

Although the terms "stator" and "rotor" have been employed herein in referring to the relatively rotatable converter members, it is contemplated that either of said members may be the stationary or rotatable member.

While I have illustrated and described what I now consider to be the best mode of applying my invention, nevertheless, various modifications of the particular arrangements herein described may readily be made, and I therefore do not desire to be limited to the exact arrangement shown and described, but seek to cover in the appended claims all those modifications that fall within the spirit and scope of my invention.

What I claim as new and desire to secure by Letters Patent of the United States, is:—

1. In combination, a single phase source of electrical energy, a phase converter of the polyphase motor type having a plurality of windings, and a three-phase load circuit, one of said converter windings being connected in shunt to one load phase, and means adapted alternatively to connect another converter winding in series with another load phase to the source of energy or to connect the last named converter winding and load phase each directly to the source of energy.

2. In combination, a single phase source of electrical energy, a phase converter of the polyphase motor type having a plurality of windings, forming three phases of the converter, and a three-phase load circuit, one of said converter phases being connected in shunt to one load phase, another converter phase being connected in shunt to another load phase, and means comprising a single circuit making and breaking device adapted alternatively to connect another converter phase in series with another load phase to the source of energy or to connect the last named converter phase and load phase each directly to the source of energy.

3. In combination, a single phase source of electrical energy, a phase converter of the polyphase motor type having a plurality of windings, a polyphase induction motor, certain of said converter windings having a common connection to one induction motor terminal and independent connections to other motor terminals, and means adapted alternatively to connect another converter winding in series with said source to a pair of induction motor terminals or to connect the last named converter winding and pair of induction motor terminals directly to said source.

4. In combination, a single phase source of electrical energy, a transformer having a primary winding, adapted to be connected to said source, and a plurality of secondary windings, a phase converter of the polyphase motor type having a plurality of windings, a polyphase induction motor, certain of said converter windings having a common connection through a transformer secondary winding to one induction motor terminal and independent connections to other motor terminals, and means adapted alternatively to connect another converter winding in series with other transformer secondary windings to a pair of induction motor terminals or to connect the last named converter winding and pair of induction motor terminals directly to a secondary winding of the transformer.

5. In combination, a single phase source of electrical energy, a three-phase induction motor adapted to be operated therefrom, and a phase converter of the polyphase motor type comprising relatively rotatable members, one of which is provided with a plurality of windings, one of said windings having two branches, each of said branches having an independent terminal and a terminal common to itself and the other branch, another of said windings having two terminals, the relative electrical condition of said windings adapting the former to be connected by means of its terminals to three induction motor terminals and the latter to be simultaneously connected by means of its terminals to two of said induction motor terminals, said windings being so proportioned that the sum of the current carrying capacities of the branches of the former winding is substantially equal to the current carrying capacity of the latter winding.

6. In combination, a single phase source of electrical energy, a three-phase induction motor adapted to be operated therefrom, and a phase converter of the polyphase motor type comprising relatively rotatable members one of which is provided with a plurality of windings adapted to constitute a plurality of phases, the windings of one phase being connected in two branches, each branch having an independent terminal and a terminal common to itself and to the other branch, said terminals being connected respectively to the terminals of the induction motor, and means adapted alternatively to connect another phase of said converter in series with a motor phase to the source of energy or to connect the last named converter and motor phases each directly to the source of energy, and means carried by another of said members for synchronously exciting the converter independently of said windings.

7. In combination, a single phase source of electrical energy, a three-phase induction motor adapted to be operated therefrom, and a phase converter of the polyphase motor type comprising relatively rotatable members one of which is provided with a plurality of windings adapted to constitute a plurality of phases, the windings of one phase being connected in two branches, each of which comprises windings connected in series and located diametrically opposite each other, each branch having an independent terminal and a terminal common to itself and to the other branch, said terminals being connected respectively to the terminals of the induction motor, and means adapted alternatively to connect another phase of said converter in series with a motor phase to the source of energy or to connect the last named converter and motor phases each directly to the source of energy, and means carried by another of said members for synchronously exciting the converter independently of said windings.

In witness whereof, I have hereunto set my hand this 9th day of February, 1917.

ERNST F. W. ALEXANDERSON.